UNITED STATES PATENT OFFICE.

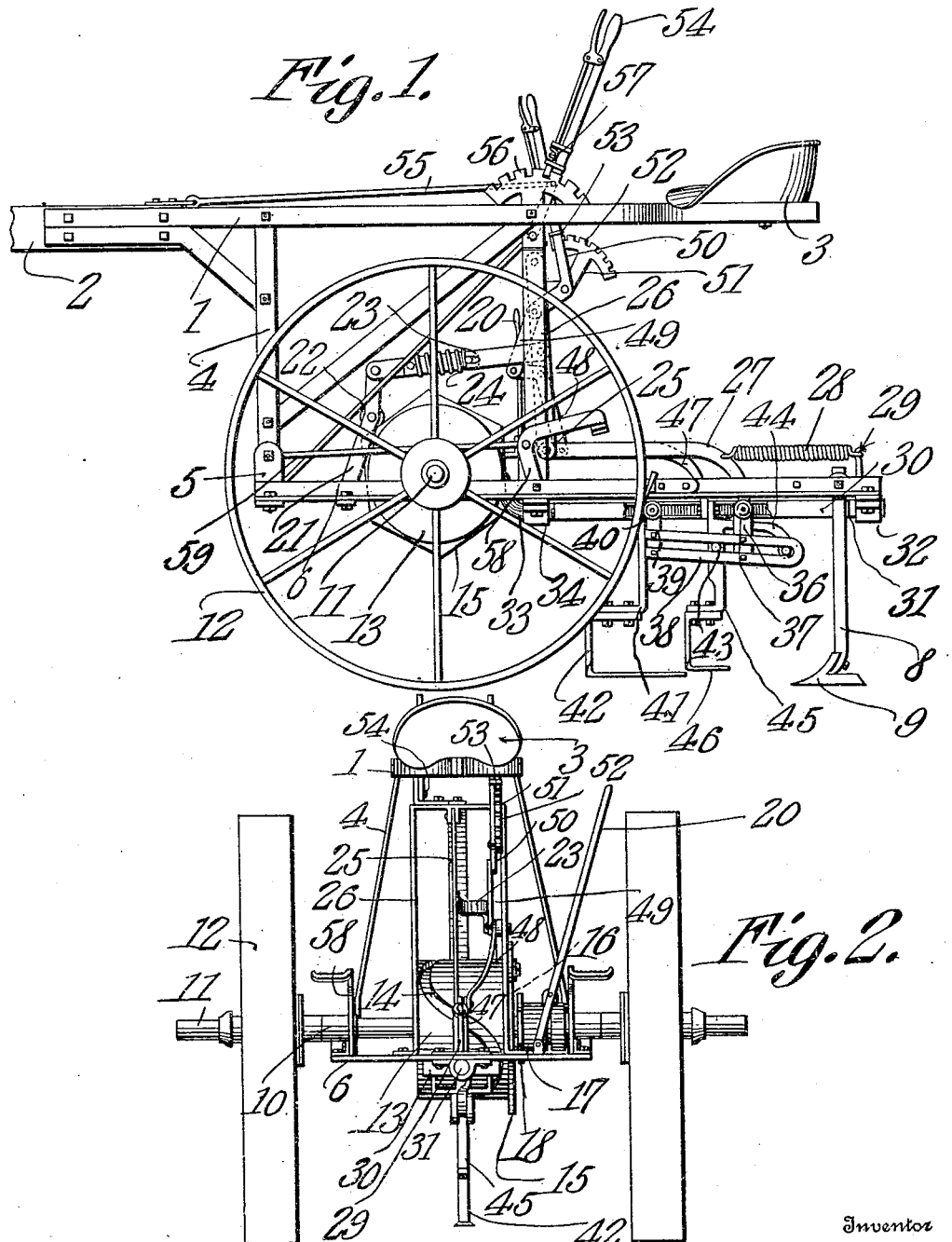

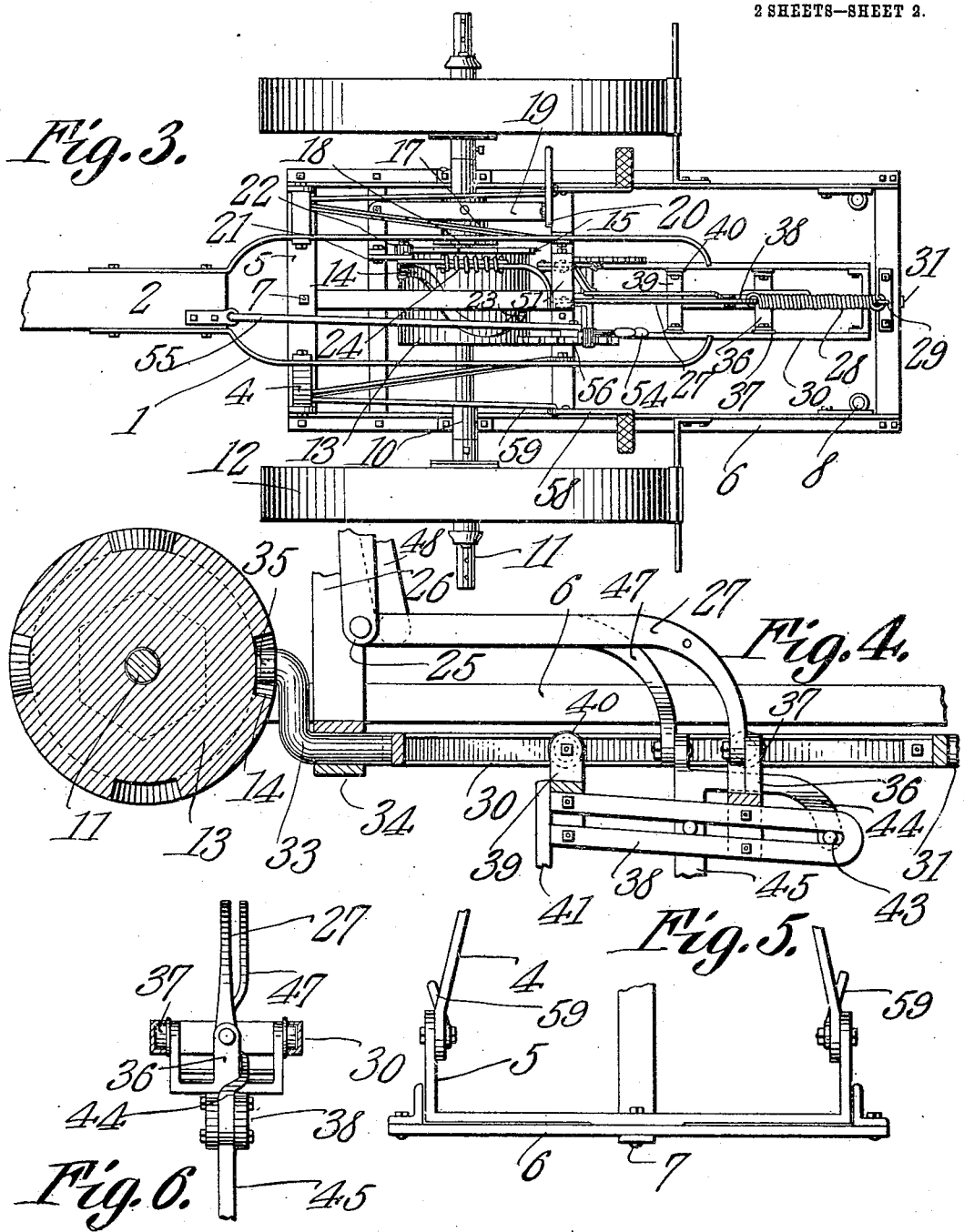

THOMAS H. ELLIS, OF ST. LOUIS, MISSOURI.

COTTON-CHOPPER.

954,566. Specification of Letters Patent. Patented Apr. 12, 1910.

Application filed December 1, 1909. Serial No. 530,801.

*To all whom it may concern:*

Be it known that I, THOMAS H. ELLIS, a citizen of the United States, residing at St. Louis, in the State of Missouri, have invented a new and useful Cotton-Chopper, of which the following is a specification.

This invention has relation to cotton choppers and it consists in the novel construction and arrangement of its parts, as hereinafter shown and described.

The object of the invention is to provide an implement of the character indicated in which the chopping hoe or blade is so mounted and actuated as to move transversely across a standing row of plants as the implement passes along the same at approximately a right angle to the said row during the chopping or cutting operation. By providing an implement as stated the chopper operates at a right angle to the line or row of standing plants during the chopping operation. The plants are cut out in blocks and the soil around those plants left standing remains undisturbed. During the chopping operation, the hoe or blade operates upon the standing plants during its movement from right to left and left to right, and while it is cutting out the superfluous plants the said blade or hoe does not move forward with the body of the machine proper, but remains substantially in a fixed position with relation to the line of movement of the implement and after the hoe has accomplished the cutting stroke it moves in a forward direction at a greater rate of speed than the implement moves in its line of travel, and consequently makes up for the movement it loses while performing the cutting operation. The hoe or blade so constructed as to readily spring itself from the trash or vegetable growth by virtue of the fact that it reverses its operation. And at the same time distributes the soil and vegetation evenly on either side of the row, a great advantage to later cultivation.

In the accompanying drawings Figure 1 is a side elevation of the cotton chopper. Fig. 2 is a rear end elevation of the same. Fig. 3 is a top plan view of the same with parts removed. Fig. 4 is a detailed sectional view of blade operating mechanism used upon the cotton chopper. Fig. 5 is a detailed elevation of the forward portion of the frame of the cotton chopper. Fig. 6 is a detailed sectional view of a portion of the frame of the cotton chopper.

Side bars 1 are connected at their forward ends to the rear end of a tongue 2 and at their rear ends support an operating seat 3. Bracket arms 4 depend from the forward portions of the side bars 1 and a yoke 5 is pivotally connected with the lower ends of the said bracket arms 4. The said yoke 5 may have vertical swing with relation to the said bracket arms. A frame 6 is pivoted at its forward end through the yoke 5 at the point 7 and the said frame may swing horizontally with relation to the said yoke. Standards 8 are attached to the rear portion of the frame 6 which carry covering plows 9. Bearings 10 are mounted upon the frame 6 and an axle 11 is journaled for rotation in the said frame. Traction wheels 12 are fixed to the end portions of the axle 11 and a drum 13 is loosely journaled upon the intermediate portion of the said axle. The said drum 13 is provided upon its periphery with a zig-zag groove 14 and at one end is provided with a hexagonal disk 15. The drum 13 is provided in one end with a non-circular recess 16, and a clutch member 17 is slidably mounted upon the axle 11 and is provided with a non-circular disk 18 adapted to enter the recess 16 in the ends of the drum 13. A lever 19 is fulcrumed upon the frame 6 and operatively connected with the clutch member 17. A lever 20 is also fulcrumed upon the frame 6 and is operatively connected with the said lever 19. The said lever 20 is upwardly disposed and when swung from one side to the other is adapted to move the lever 19 whereby the portion 18 of the clutch member 17 is moved into engagement with or out of engagement from the recess 16 in the drum 13. It is of course understood that when the clutch member 17 is moved into engagement with the drum 13 that the said drum 13 will rotate in unison with the axle 11.

An arm 21 is fulcrumed upon the frame 6 and is provided at a point intermediate its ends with a roller 22 which is adapted to operate against the periphery of the disk 15. A sectional arm 23 is connected with the upper end of the arm 21 and the sections of the said arm 23 are joined together by a coiled spring 24 so that the arm 23 is longitudinally extensible to a certain degree. At its rear end the sectional arm 23 is pivotally connected with an arm 25 which in turn is pivoted to the upper portion of a bracket 26 mounted upon the frame 6. At its lower end the arm 25 is pivotally connected with the forward end of an arm 27 which extends back along the rear portion of the frame 6. The forward end of a coiled spring 28 is fixed to the rear portion of the arm 27 and the rear end of the said spring 28 is attached to a lug 29 mounted upon the rear end of the frame 6. The spring 28 is under tension with a tendency to hold the arm 27 and its attachment to the rearward position of the frame 6.

A frame having side rails 30 is pivoted upon the frame 6 and the said pivoted frame at its rear end is provided with a gudgeon 31 which is journaled in a bearing 32 mounted on the said frame 6. A crank shaft 33 is attached to the forward end of the frame of which the rails 30 form component parts and the said crank shaft 33 is journaled in a bearing 34 on the frame 6. The shaft 33 is provided upon its forward end with a journaled roller 35 which is located in the zigzag groove 14 of the drum 13.

The rear end of the arm 27 is pivotally connected with a bracket 36 which is provided with journaled wheels 37 adapted to travel along the side rails 30. Guides 38 are attached to the bracket 36 and the forward ends of the said guides are connected together by a bracket 39 which is also provided with rollers 40 adapted to travel upon the side rails 30. An angle arm 41 depends from the bracket 39 and to the lower end of the said arm 41 is attached an approximately U-shaped cutting knife 42. Cross bars 43 are slidably mounted in the guides 38 and are supported by a spine 44. An angle arm 45 depends from the said spine 44 and is provided at its lower end with an approximately U-shaped cutting blade 46. An arm 47 is pivotally connected at its rear end with the spine 44 and the forward end of the arm 47 is pivotally connected to a rocker lever 48 fulcrumed upon the bracket 26 mounted upon the frame 6. The lower end of a link 49 is pivotally connected to the upper end of the rocker arm 48 and the upper end of the said link 49 is pivoted to the lower end of a lever 50 which is fulcrumed upon a rearwardly disposed arm 51 mounted upon the bracket 26 and having a gear segment 52. The lever 50 is provided with a spring actuated pawl 53 which is adapted to engage the teeth of the segment 52. A lever 54 is also fulcrumed upon the bracket 26 and a rod 55 is pivotally connected at its rear end to the said lever 54 and at its forward end to the rear end portion of the tongue 2. A gear segment 56 is mounted upon the bracket 26 adjacent the lever 53 and the said lever 54 is provided with a spring actuated pawl 57 adapted to engage the teeth of the segment 56. Stirrup levers 58 are fulcrumed to the sides of the frame 6 at points intermediate the ends thereof, and rods 59 are pivoted at their rear ends to the said stirrup levers 58 and at their forward ends to the bracket 4.

By this arrangement of parts it will be seen that as the drum 13 rotates upon the axis of the axle 11 that the crank shaft 33 will be rocked in its bearings 34, and consequently the frame of which the rails 30 form the sides is rocked within the frame 6. Thus the knives 42 and 46 are moved transversely across the row of standing plants to cut out the superfluous plants in the row. At the same time by reason of the fact that the roller 22 is in contact with the periphery of the disk 15, the arm 21 is rocked upon its fulcrum and the arm 23 is moved longitudinally. Such movement on the part of the arm 23 swings the arm 25 which in turn moves the arm 27 and the guide 38. As the knife 42 is making a chopping stroke the guides 38 move rearwardly and consequently during such chopping strokes the knife 42 is approximately at rest with relation to the forward movement of the implement. Thus a chopping stroke is made directly across the line of plants approximately at a right angle to the said lines. By swinging the lever 50 the link 49 is moved longitudinally which in turn will swing the rocker lever 48. Such movement upon the part of the rocker lever will move the arm 47 longitudinally which will shift the cross rods 43 in the guides 38 so that the knife 46 is adjusted in its position toward or away from the knife 42. Thus the length of the combined stroke of the two knives may be increased or diminished as desired. The guides 38 are slightly inclined in a downward direction toward their rear ends as illustrated in Fig. 1 of the drawings in order that the cutting edge of the knife 46 may be properly positioned with relation to the cutting edge of the knife 42 when the knife 46 is adjusted to the farthest extent to the rear of the said knife 42. When the knife 46 is adjusted toward the knife 42 its cutting edge may lie over the cutting edge portion of the said knife 42 as indicated in Fig. 1 of the drawing. An operator may raise or lower the rear portion of the frame 6 by disengaging the spring pawl 57 from the teeth of the segment 56 and permitting the rear portion of the frame 6 to fall or elevate when the said pawl 57 is again permitted to engage the teeth of the segment 56. An operator occupying the seat 3 and having his feet in the stirrups at the upper ends of the lever 58 may guide the machine laterally to a limited extent to cause the knives 42 and 46 to properly operate upon the standing row of plants.

Having thus described my invention what I claim as new and desire to secure by Letters-Patent is:

1. A cotton chopper comprising a frame, an axle journaled for rotation thereon, traction wheels mounted upon the axle, a drum supported upon the axle and having a continuous zig-zag groove in its periphery, said drum having formed at one part thereof a non-circular disk, an arm fulcrumed upon the frame and having a roller in contact with the periphery of the disk, a second arm pivotally connected with the first said arm, a third arm pivotally connected with said second arm and pivoted to the frame, an oscillating frame pivoted in the first said frame, a carriage mounted for movement along the oscillating frame and connected with said third arm, said oscillating frame having a crank shaft the end of which is located in the said zig-zag groove.

2. A cotton chopper comprising a wheel mounted frame, an oscillating frame mounted for movement upon the wheel mounted frame, means for oscillating the said oscillating frame, a carriage mounted for movement along the oscillating frame, means for moving the carriage along the oscillating frame, a knife fixed with relation to the said carriage and a knife adjustably mounted upon the carriage with relation to the first said knife.

3. A cotton chopper comprising a wheel mounted frame, an oscillating frame mounted upon the said wheel mounted frame, means for oscillating the said oscillating frame, a carriage mounted for movement along the oscillating frame, means for moving the carriage along the oscillating frame, a knife fixed with relation to the said carriage and a knife adjustably mounted upon the carriage and adapted to be shifted in its position with relation to the first said knife to overlap a portion of the same.

In testimony that I claim the foregoing as my own, I have hereto affixed my signature in the presence of two witnesses.

THOMAS H. ELLIS.

Witnesses:
 J. P. HELY,
 CHAS. M. DREYEN.